United States Patent [19]

Krivec

[11] 4,008,798
[45] Feb. 22, 1977

[54] TURNTABLE
[75] Inventor: Bert Krivec, Waukesha, Wis.
[73] Assignee: Rexnord Inc., Milwaukee, Wis.
[22] Filed: Sept. 12, 1975
[21] Appl. No.: 612,961
[52] U.S. Cl. .............................. 198/411; 198/786; 198/787
[51] Int. Cl.² ................. B65G 47/24; B65G 13/02
[58] Field of Search ...................... 198/127 R, 286; 193/35 R, 35 MD, 37; 200/6 A, 628

[56] References Cited
UNITED STATES PATENTS

| | | | |
|---|---|---|---|
| 3,645,379 | 2/1972 | Kornylak | 198/127 R |
| 3,679,043 | 7/1972 | Becker | 198/35 MD |
| 3,710,917 | 1/1973 | Black et al. | 198/127 R |
| 3,770,915 | 11/1973 | Bennett | 200/6 A |
| 3,804,230 | 4/1974 | Krivec | 198/127 R |

Primary Examiner—Evon C. Blunk
Assistant Examiner—Joseph E. Valenza
Attorney, Agent, or Firm—Sughrue, Rothwell, Mion, Zinn & Macpeak

[57] ABSTRACT

A turntable comprising a plurality of transfer roller assemblies of the type disclosed in U.S. Pat. No. 3,804,230. The transfer roller assemblies are mounted in planar array, and means are provided for controlling the direction of rotation of the cylindrical rollers and stub rollers in selected subsets of the planar array so as to impart rotary and/or translational motion to an object positioned on the array. Two alternative embodiments are disclosed.

4 Claims, 8 Drawing Figures

FIG.2
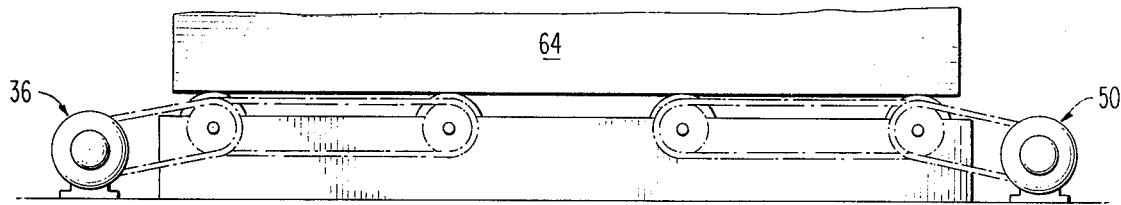
FIG.5
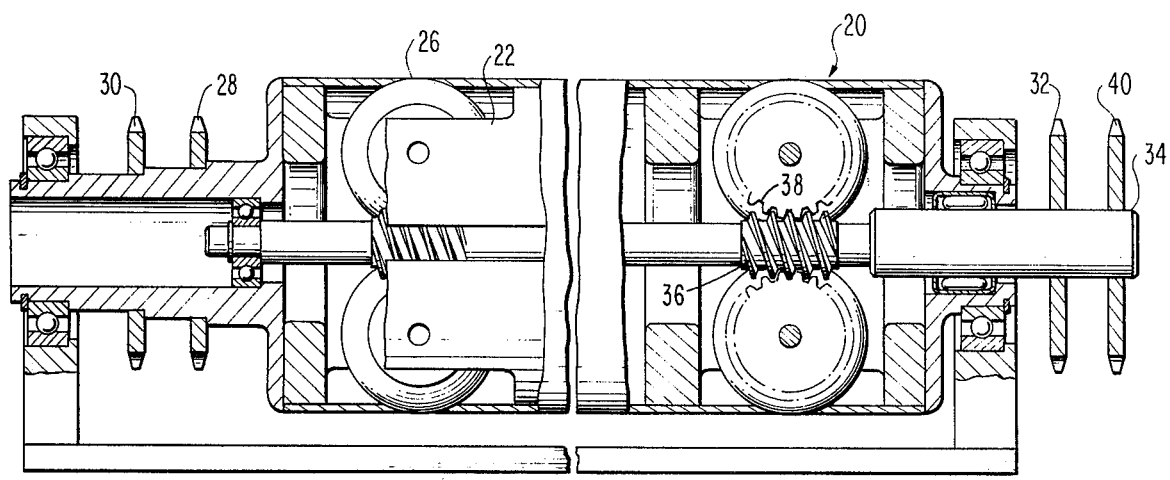
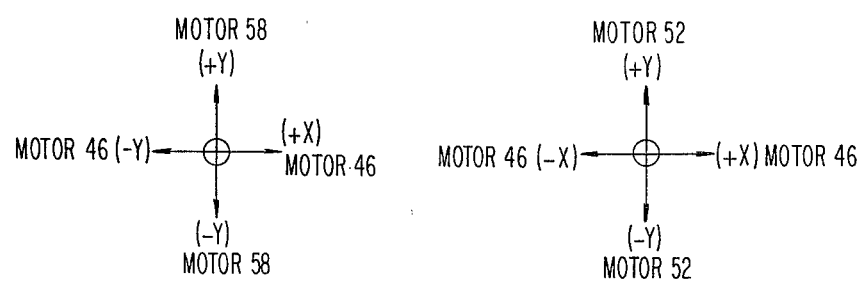
FIG.6

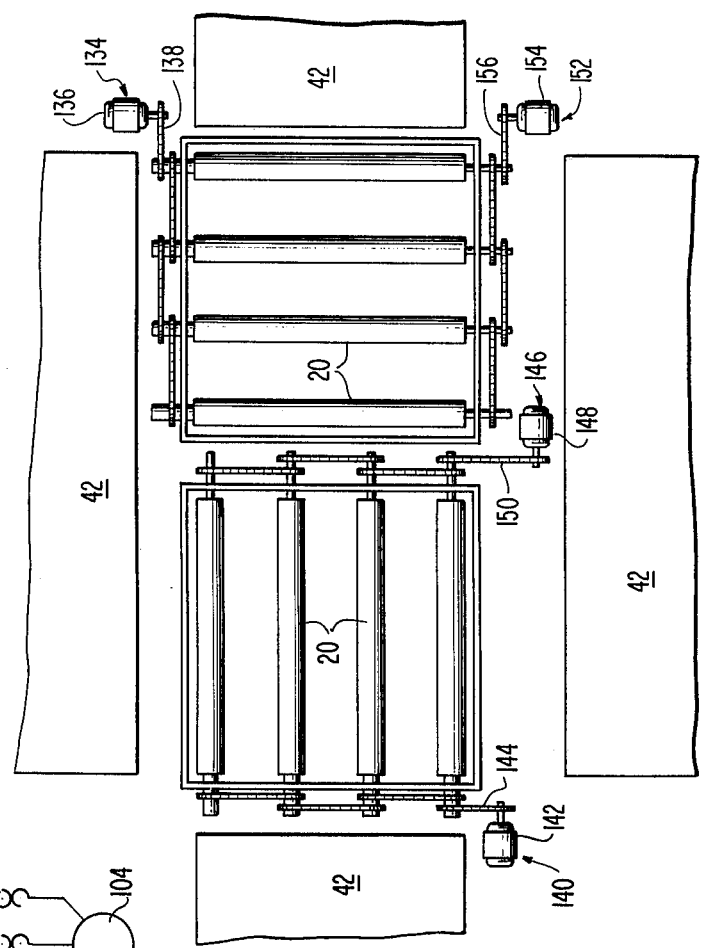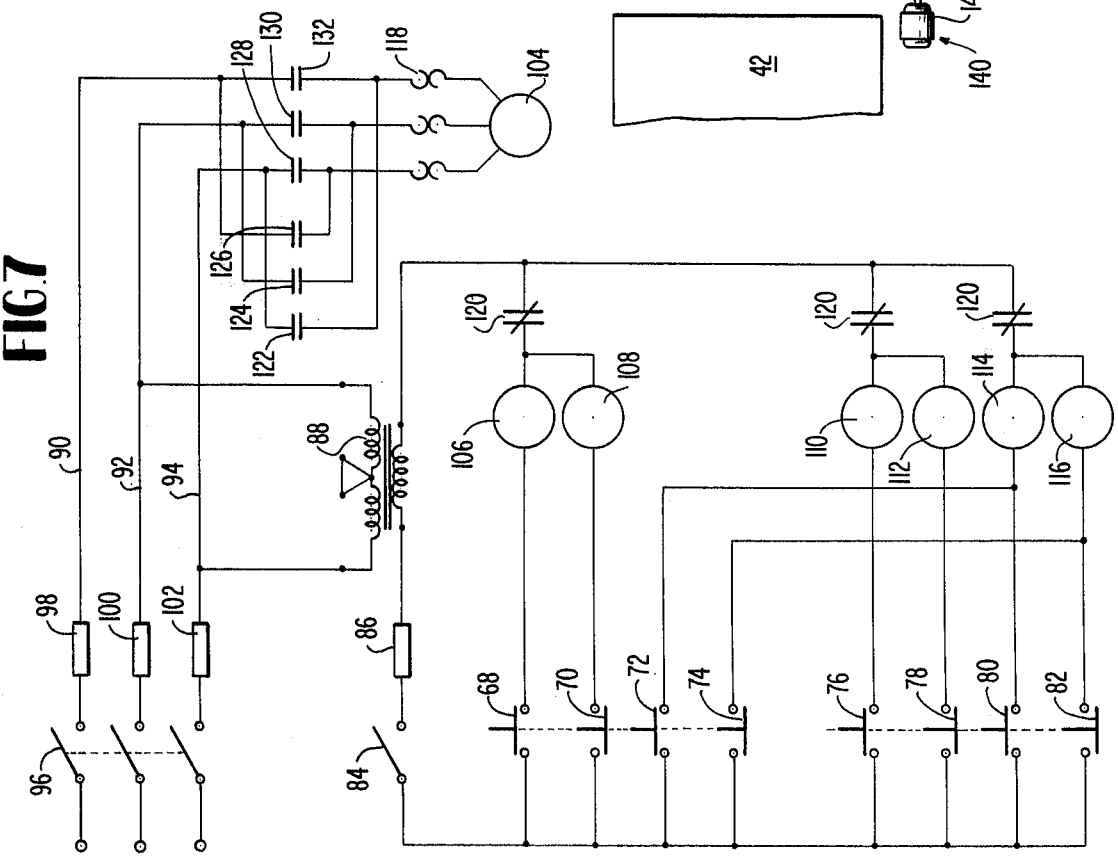

TURNTABLE

FIELD OF THE INVENTION

This invention relates generally to turntables for rotating articles, such as boxes or pallets.

SUMMARY OF THE INVENTION

The turntable disclosed and claimed herein comprises a plurality of transfer roller assemblies of the type disclosed in U.S. Pat. No. 3,804,230. The transfer roller assemblies are mounted in planar array, and means are provided for controlling the direction of rotation of the cylindrical rollers and stub rollers in selected subsets of the planar array so as to impart rotary and/or translational motion to an object positioned on the array.

BRIEF DESCRIPTION OF THE DRAWINGS

FIG. 2 is a simplified side view of the turntable shown in FIG. 1.

FIG. 5 is a cross-sectional view of a single transfer roller assembly of the type employed in turntables according to the present invention.

FIG. 6 is a schematic diagram used to illustrate the operation of the joystick which controls the operation of the turntable shown in FIG. 1.

FIG. 7 is a schematic diagram of the control means for the turntable shown in FIG. 1.

FIG. 8 is a simplified plan view of a second embodiment of a turntable according to the present invention.

DETAILED DESCRIPTION OF THE PREFERRED EMBODIMENTS

Turntables according to this invention employ transfer roller assemblies of the type disclosed in U.S. Pat. No. 3,804,230, and familiarity with the disclosure in that patent is presumed herein. However, one of the transfer roller assemblies will be briefly described with the aid of FIGS. 3–5 for readier understanding of this invention.

Figure 4:
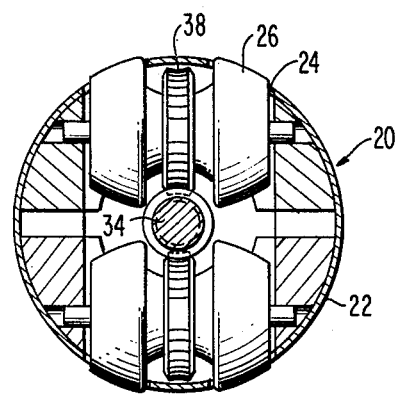
FIG. 4 is a view along the line 4—4 in FIG. 3.
Figure 3:
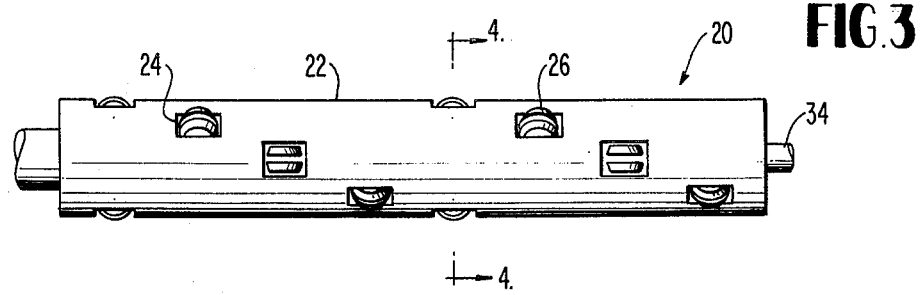
FIG. 3 is a view of a single transfer roller assembly of the type employed in turntables according to the present invention.

As illustrated in FIGS. 3–5, each transfer roller assembly 20 comprises a hollow cylindrical roller 22 having a plurality of spaced apertures 24 in the surface thereof and a plurality of stub rollers 26 mounted in each roller 22 such that their axes of rotation are not parallel to the axis of rotation of the roller 22 in which they are mounted and such that a portion of the surface of each of the stub rollers 26 protrudes through a corresponding one of the plurality of spaced apertures 24. As explained in more detail in the above-mentioned patent, in practice it has been found preferable to mount the stub rollers 26 in balanced pairs, the axes of which are coplanar, parallel to each other, and perpendicular to the axis of the roller 22 in which they are mounted. The roller 22 may be rotated about its axis of rotation by means of sprocket 28 (shown at the left in FIG. 5), and the rotary motion of the roller 22 may be passed on to an adjacent roller by means of sprocket 30 and an appropriate chain (not shown in FIGS. 3–5). The stub rollers 26 may be rotated about their axes of rotation by means of sprocket 32 (shown at the right in FIG. 5), shaft 34, driving worm gears 36, and driven worm gears 38, and the rotary motion of the shaft 34 (and thus of the stub rollers 26) may be passed on to an adjacent shaft by means of sprocket 40 and an appropriate chain (not shown in FIGS. 3–5).

Figure 1:
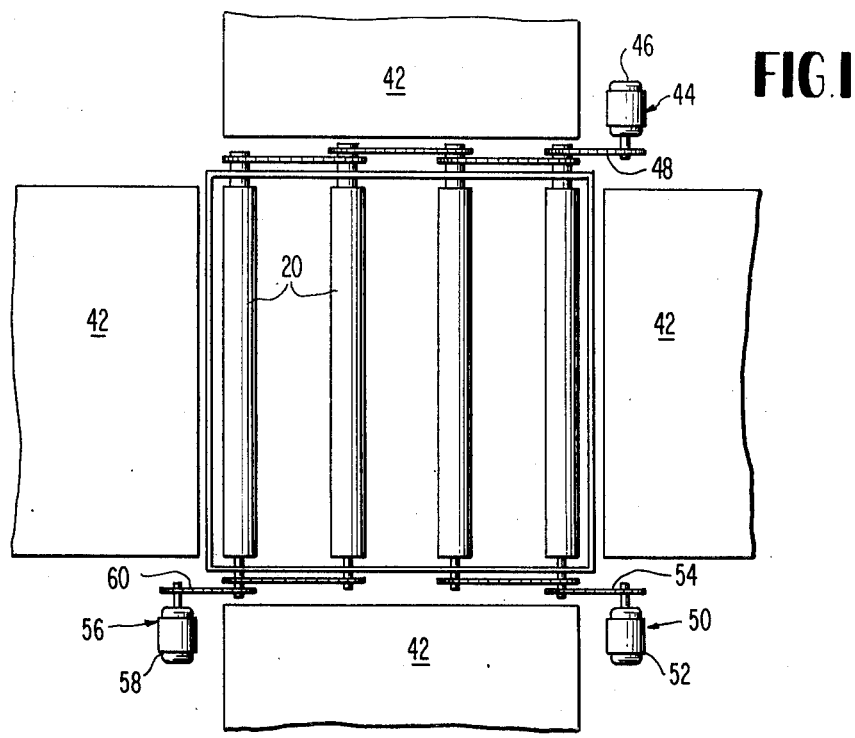
FIG. 1 is a simplified plan view of a first embodiment of a turntable according to the present invention.

A turntable employing a single rank of parallel transfer roller assemblies 20 is shown in FIG. 1. The turntable may consist of more or less transfer roller assemblies as needed, and castered wheels or other unpowered devices may be interspersed with the transfer roller assemblies to aid in supporting objects to be rotated. Four input/output conveyors 42 are shown feeding to the turntable, and the purpose of the turntable is to accept an object, such as a box or a pallet, and translate it and/or rotate it so that it can leave the turntable on any one of the four conveyors in any desired orientation. In order to accomplish this, means 44 comprising a motor 46 and chains 48 are provided for rotating the cylindrical rollers 22 in a selected direction, means 50 comprising a motor 52 and chains 54 are provided for rotating the stub rollers 26 in a first file, or subset, of adjacent transfer roller assemblies, and means 56 comprising a motor 58 and chains 60 are provided for rotating the stub rollers 26 in a second file, or subset, of adjacent transfer roller assemblies.

The means 44, 50, and 56 are controlled by two joysticks the operation of which is illustrated in FIG. 6. Such joysticks are commercially available; for instance, I have successfully used joysticks sold by Culter-Hammer and having the part No. 10250T451. They are factory assembled with a gate arranged for four handle positions, and three additional gates, allowing two, three, and eight handle positions, are included in the package. In the embodiment shown in FIG. 1, the joysticks are used with the gate providing four handle positions. As shown in FIG. 6, one joystick is connected to motors 46 and 58, and the other joystick is connected to motors 46 and 52. When the joysticks are in their central positions, none of the motors are engaged, and neither the cylindrical rollers 22 nor the stub rollers 26 rotate. When each of the joysticks is moved to one of the handle positions shown, the indicated motor causes the rollers to which it is connected to rotate in the indicated direction, and by selecting appropriate handle positions, an object positioned on the turntable can be caused to translate and/or rotate. For instance, if the left-hand joystick in FIG. 6 is moved to the right handle position and the right-hand joystick is left in the center, an object on the turntable will move from left to right on the turntable, while if the left-hand joystick is moved to the upper position and the right-hand joystick is moved to the lower position, an object on the turntable will rotate in the clockwise direction.

It will be immediately apparent that, if the geometric and/or mass center of an object to be rotated is not perfectly centered on the y-axis in FIG. 6 when a rotation is begun, the object will have a tendency to drift upward or downward, depending on which side of the y-axis it is centered on. However, the joystick can be used to counter the tendency to drift. If, for instance, an object on the turntable starts to drift upwards in FIG. 6 while being rotated in the clockwise direction, the left-hand joystick can be moved from the upper position to the lower position, causing the object to move downwardly in FIG. 6, and then one or both joysticks can be moved to the right-hand position to cause the object to move towards the y-axis when the operator estimates that the object has moved down to a desired position with respect to the x-axis. (It should be pointed out that the desired position with respect to the x-axis is not necessarily centered on the x-axis where, as in the FIG. 1 embodiment, all the cylindrical rollers are controlled by a single means which rotates them all in the same direction.)

FIG. 7 shows the wiring of the control means for the turntable shown in FIG. 1. Switch 68 is connected to the +y position for the left-hand stub rollers (i.e., the upper position of the left-hand joystick), switch 70 to the −y position for the left-hand stub rollers, switch 72 to the −x position for the cylindrical rollers, switch 74 to the +x position for the cylindrical rollers, switch 76 to the +y position for the right-hand stub rollers, switch 78 to the −y position for the right-hand stub rollers, switch 80 to the −x position for the cylindrical rollers, and switch 82 to the +x position for the cylindrical rollers, each of these switches being spring-biased to center position, as shown. Switch 84 is the control power switch, and fuse 86 is a circuit protection fuse for the control circuit. Power is provided to the control circuit via the transformer 88 connected to two of the three-phase power lines 90, 92, and 94. A manual switch 96 and motor protector fuses 98, 100, and 102 are provided in the power lines. The reversing motor 104 shown is a "typical" motor — that is, it could be motor 46, motor 52, or motor 58. Motor control relays 106, 108, 110, and 112 are connected to the switches 68, 70, 76, and 78, respectively, the motor control relay 114 is connected to the switches 72 and 80, and the motor control relay 116 is connected to the switches 74 and 82. Each pair of motor control relays (i.e., motor control relays 106 and 108, motor control relays 110 and 112, and motor control relays 114 and 116) is connected to a reversing motor, such as the reversing motor 104 shown, via overload protective devices 118 which include the elements 120. Thus, when one of the switches 68, 70, 72, 74, 76, 78, 80, 82 is closed, the associated motor control relay causes the appropriate ones of the contacts such as contacts 122, 124, 126, 128, 130 and 132 to close. For instance, if the reversing motor 104 is associated with the motor control relays 106 and 108 and the switch 68 is closed, the contacts 122, 124, and 126 are caused to close, while if the switch 70 is closed, the contacts 128, 130, and 132 are closed. Since the motor control relays 114 and 116 are each associated with two switches, conventional electrical and mechanical interlocking means are provided to cause those motor control relays to respond only to the first of the two associated switches to be activated. Alternatively, one four-position and one two-position joystick could be used with each motor control relay being connected to only one switch, but that arrangement is not presently preferred because of considerations of operator psychology.

The illustrated joysticks are simple on/off devices. That is, when one of the switches 68 etc. is closed, the associated reversing motor is simply turned on and builds to a preset speed as rapidly as the load on it permits. For most applications, that configuration is entirely adequate, the inertia of the system being sufficient to prevent hazardous accelerations and decelerations. However, for some applications it may be desirable to provide more sophisticated joysticks in which the speed of rotation is variable and controlled continuously by the position of the joystick.

Similarly, the embodiments illustrated are designed for manual control, but it would obviously be a simple matter to automate the control if either the speed of the turntable or the environment in which it was to be used precluded manual control, and the plurality of motors illustrated could be replaced by a single motor and an appropriate system of clutches and power transmission means.

An alternative embodiment of the turntable is shown in FIG. 8. In most respects its construction and operation are very similar to those of the FIG. 1 embodiment, and accordingly the same numeric designations are used for the same parts where applicable. However, this embodiment uses two mutually perpendicular planar arrays of the transfer roller assemblies 20. Accordingly, four separate motor means must be provided: means 134 comprising a motor 136 and chains 138 are provided for rotating the cylindrical rollers in the right-hand array in a selected direction, means 140 comprising a motor 142 and chains 144 are provided for rotating the cylindrical rollers in the left-hand array in a selected direction, means 146 comprising a motor 148 and chains 150 are provided for rotating the stub rollers in the left-hand array in a selected direction, and means 152 comprising a motor 154 and chains 156 are provided for rotating the stub rollers in the eight-hand array in a selected direction. Of course, additional, non-powered support means could again be interspersed among the powered support means.

The control apparatus for the embodiment shown in FIG. 8 is obviously somewhat more complex than that for the embodiment shown in FIG. 1, and for that reason it is not currently the preferred embodiment, but exactly the same principles are employed, and for that reason the control apparatus for the FIG. 8 apparatus will not be separately described.

Caveat

While the present invention has been illustrated by detailed descriptions of two embodiments thereof, it will be obvious to those skilled in the art that various changes in form and detail can be made therein without departing from the true scope of the invention. For that reason, the invention must be measured by the claims appended hereto and not by the foregoing preferred embodiments.

What is claimed is:
1. A turntable comprising:
 a. a plurality of transfer roller assemblies mounted in planar array, each of said transfer roller assemblies comprising:
  i. a hollow cylindrical roller having a plurality of spaced apertures in the surface thereof and
  ii. a plurality of stub rollers mounted in said hollow cylindrical roller such that their axes of rotation are not parallel to the axis of rotation of said hollow cylindrical roller and a portion of the surface of each of said stub rollers protrudes through a corresponding one of said plurality of spaced apertures in said hollow cylindrical roller;
 b. first means for rotating said hollow cylindrical rollers in a first subset of adjacent ones of said transfer roller assemblies in a selected direction;
 c. second means for rotating said hollow cylindrical rollers in a second subset of adjacent ones of said transfer roller assemblies in a selected direction;
 d. third means for rotating said stub rollers in said first subset of said transfer roller assemblies in a selected direction;

e. fourth means for rotating said stub rollers in said second subset of said transfer roller assemblies in a selected direction; and f. fifth means for controlling said first, second, third, and fourth means so that the direction in which said third means causes the stub rollers in said first subset of said transfer roller assemblies to rotate is independent of the direction in which said fourth means causes the stub rollers in said second subset of said transfer roller assemblies to rotate and so that an object positioned upon said plurality of transfer roller assemblies can be caused to rotate and/or translate with respect to said plurality of transfer roller assemblies.

2. A turntable as claimed in claim 1 wherein said first and second means cause said hollow cylindrical rollers in said first and second subsets of said transfer roller assemblies to rotate in the same direction.

3. A turntable as claimed in claim 2 wherein the hollow cylindrical rollers in said first subset of said transfer roller assemblies are parallel to the hollow cylindrical rollers in said second subset of said transfer roller assemblies.

4. A turntable as claimed in claim 1 wherein the hollow cylindrical rollers in said first subset of said transfer roller assemblies are parallel to the hollow cylindrical roller in said second subset of said transfer roller assemblies.

* * * * *